106. COMPOSITIONS, COATING OR PLASTIC.

Patented June 11, 1940

2,203,809

UNITED STATES PATENT OFFICE 2,203,809

MANUFACTURE OF PORTLAND CEMENT

Ira C. Bechtold, Colton, Calif., assignor to California Portland Cement Company, Los Angeles, Calif., a corporation of California No Drawing. Application March 18, 1938,
Serial No. 196,701

15 Claims. (Cl. 106—25)

This invention relates to the manufacture of Portland cement, and has for its general objects to promote ease of grindability of Portland cement clinker, or mixtures of the clinker, and to improve the properties of the finished cement in a number of important respects. More specifically, the invention has to do with the use of so-called "grinding aids" which when added in small percentages to Portland cement clinker, facilitate its grinding, and in the present instance, desirably influence the properties of the resulting cement. It is to be understood that the invention is applicable to the manufacture of Portland cements in general, and which may or may not contain added materials beside the substance used as a grinding aid.

Particularly in more recent years, the tendencies in Portland cement manufacture have been to grind the clinker to increasingly high degrees of fineness. To illustrate, it is common practice now to grind cements to specific surfaces well in excess of 2000 and as high as 2500 sq. cm. per gram, and upwards. This practice has resulted in greatly increased grinding costs due to the known fact that excessive energy normally is required for grinding to the higher levels, and the energy increase is proportionately greater as the fineness increases. The inefficiency of grinding at high finenesses is due to the tendency of the fine clinker particles to accumulate and build up as layers on the surface of the grinding media and mill, thus cushioning the grinding action by preventing direct contact and interaction between the grinding surfaces. Not only is grinding efficiency impaired, but the mill frequently becomes overheated due to the generation of heat within the cushioning layers of fine particles. It has been known that the addition of certain substances to the Portland cement clinker will to some extent cause dispersion of fine particles within the clinker mass, thus freeing the particles from the grinding surfaces and consequently increasing the grinding efficiency by virtue of the more direct interaction of the grinding media.

I have found, in accordance with the invention, that a certain class of substances, the substituted glycerols, have marked effectiveness as grinding aids and that as such, they are decidedly superior to other substances commonly used for that purpose. The substituted glycerols not only greatly increase ease of grinding, but they also improve, in general, the properties of the finished cement. This is another important advantage over the usual grinding aids since use of the latter frequently results in impairment of some of the desirable properties of the cement, such as color, setting and strength qualities, and expansion on hardening. The present cement shows setting and strength properties that are at least as favorable as, and in some instances more favorable than the corresponding properties of the same cement lacking the grinding aid material, and ground using the same amount of energy.

It is to be understood that for the purposes of the invention, I may use any suitable substituted glycerol, or combination thereof, depending upon considerations such as the composition of the clinker or clinker mixture and the particular substituted glycerol that may be found to give the desired or best results in the finished cement. By substituted glycerols I refer generally to glycerol derivatives formed by substituting for any one of the OH radicals, a suitable element or group, such as one of the halogens or organic ester groups.

Examples are glycerol monochlorohydrin and other like halogen substitution compounds; also glycerol mono acetic ester and other corresponding esters of the ethyl, propyl, butyl series. Glycerol mono acetic ester is known also as monoacetin, which has the alpha and beta isomeric forms, either or both of which are suitable. The substituted glycerol grinding aid may be interground with the clinker in any suitable proportions. Ordinarily, the percentage thereof will not exceed 0.50% by weight of the cement, and preferably will be held within from 0.05 to 0.30%, since small percentages within that range have been found sufficient to facilitate grinding to the extent desired.

The effectiveness as grinding aids, of monoacetin and glycerol monochlorohydrin, as well as the properties of finished cements interground therewith, are illustrated by the data tabulated below. In compiling this data, tests were made for the purpose of comparing the properties of a normal Portland cement control sample with samples of the same cement interground with each of the substituted glycerols in different proportions. These tests were made using a common supply of commercial Portland cement clinker stock crushed and pulverized until 100% passed an 8 mesh sieve, and all grinding experiments therefore were performed on material of the same composition and initial particle size distribution. Individual samples of the crushed clinker stock, each consisting of 1816 grams thereof and 69 grams of gypsum, were prepared and small amounts of the admixture substances added to the samples, except to the "control" sample, in percentages as indicated in the table. The individual samples were then subjected to two stage grinding in a steel jar mill 11½" in diameter and 10" long. The preliminary grinding consisted of 900 revolutions in the mill with a ball charge of 45 lbs. of steel balls 1¼" in diameter. The final grinding consisted of the tabulated number of revolutions in the mill with a ball charge of 70 lbs. of steel balls ⅜ to ½" in diameter. While the substances used as grinding aids may be added to the clinker in any suitable manner, in the tests tabulated, measured quantities thereof in the percentages indicated, were introduced directly to the clinker in the mill.

After grinding, the several lots of cement were subjected to various physical tests to determine their properties. Fineness was determined by the Wagner turbidimeter using the method described in Proceedings of the American Society for Testing Materials, vol. 33, part II, page 553, 1933. An alternate determination was made by means of an air analyzer of the Pearson type to determine the proportion of particles smaller than 20 microns in diameter present in the ground cement. Water required for "normal consistency" was determined by the well known method. Setting time was determined by means of the Gilmore needle on standard pats. Strength tests were made by the A. S. T. M. method for tensile strength using a 1:3 Ottawa sand mortar. Data on soundness were secured by autoclaving 1 by 1 by 5 inch (gauge length) bars of neat cement paste at 420° F. and 300 lb. steam pressure for a period of 5 hours. This included a 1 hour period for raising the temperature of the autoclave and 1 hour for cooling. These bars were measured by means of a micrometer comparator before and after autoclaving.

to lower finenesses, grinding aids will have the effect of reducing the required amount of energy just as at high finenesses. It has also been determined that there is a highly desirable increase in the production of particles in the range 20 to 40 microns. This contributes to obtaining a more nearly linear particle size distribution. For this reason the plastic properties of the improved cements are better than cements without the grinding aid at the same fineness.

In other respects the properties of the finished cements interground with the substituted glycerols compare favorably with the corresponding properties of the control sample. Sample B to G uniformly show reductions in expansion determined by the autoclave test, a feature of obvious advantage. These samples also display, generally, reduced initial setting times and increased tensile strengths at from 1 to 28 days.

In the past this subject has not been well-developed in the art as far as the fundamental aspects of the action of grinding aids are concerned. The basic principles of chemistry and physics which explain the mechanisms underlying the packing or caking of finely ground cements in the milling operation have not been thoroughly investigated nor adequately explained. Furthermore, an adequate explanation of the fundamental phenomena which are involved in the action of grinding aids has not been known. This is especially true of any knowledge which will apply to a wide variety of organic substances of extreme diversity of chemical and physical properties.

While this invention is not to be considered as restricted to any particular theory there are certain hypothetical explanations which are useful in considering the subject matter of this specification. It is thought that cement particles may be regarded as heterogeneous masses composed of several crystalline compounds embedded in a matrix of glass-like, undercooled melt. As

| | Admixture | Percent | Fineness | | Grinding time | | Percent water for N. C. | Percent net expansion in autoclave | Setting time | | | | Std. 1:3 tensile strength | | |
|---|---|---|---|---|---|---|---|---|---|---|---|---|---|---|---|
| | | | 0/0-20 microns | Specific surface | 45 lb. 1¼ in. balls | 70 lb. ⅜-½ in. balls | | | Initial | | Final | | 1D | 7D | 28D |
| | | | | | | | | | Hr. | Min. | Hr. | Min. | | | |
| | | | | | Revolutions | Revolutions | | | | | | | | | |
| A | Control | | 54.8 | 1953 | 900 | 1,823 | 23.5 | +0.490 | 2 | 46 | 5 | 15 | 153 | 391 | 441 |
| B | Monoacetin | 0.10 | 63.1 | 2151 | 900 | 1,823 | 27.0 | +0.444 | 3 | 00 | 5 | 47 | 189 | 429 | 491 |
| C | ....do | 0.25 | 62.5 | 2301 | 900 | 1,823 | 26.5 | +0.430 | 1 | 30 | 3 | 15 | 155 | 412 | 483 |
| D | Glycerol monochlorohydrin | 0.10 | 63.6 | 2140 | 900 | 1,823 | 27.5 | +0.422 | 2 | 21 | 5 | 38 | 194 | 417 | 466 |
| E | ....do | 0.25 | 64.1 | 2205 | 900 | 1,823 | 26.5 | +0.310 | 2 | 15 | 5 | 31 | 255 | 357 | 508 |
| F | ....do | 0.25 | 70.5 | 2487 | 900 | 2,270 | 27.0 | +0.438 | 1 | 42 | 5 | 20 | 267 | 398 | 433 |
| G | ....do | 0.25 | 75.2 | 2518 | 900 | 2,720 | 27.0 | +0.372 | 1 | 37 | 4 | 05 | 275 | 412 | 467 |

The table shows marked increases in the specific surfaces of the samples interground with monoacetin and glycerol monochlorohydrin, as compared with the specific surface of the control sample, the specific surface increase in samples B, C, D and E ranging from slightly under 200, to substantially 350. For the purpose of indicating increases in fineness obtainable by prolonging the grinding, samples F and G were subjected in the second stage grinding to 2270 and 2720 revolutions, respectively, of the mill. These samples show specific surfaces of 2487 and 2518, thus indicating that higher degrees of fineness may be attained by prolonging the grinding period. It will be understood of course that the particular range of specific surfaces set out in the table are typical only, and that the cements may be ground to different fineness with the same beneficial results. Thus if it is desired to grind the cement these are reduced in size they may become less heterogeneous by virtue of approaching the size corresponding to that of the grains of the individual constituents. It may even be possible that in some cases the smallest particles consist of a single constituent. At this point the situation may be such as that believed to exist when a crystalline mass is reduced in size to the point where the crystal lattice is no longer complete. That is to say, the surface of the individual particle consists of partial unit cells and the particle as a whole does not have its atoms proportioned in an exact stoichiometrical ratio. Therefore, polar groups would be present in electrically unbalanced numbers on an individual particle. Two such particles with groups having their balance shifted to opposite electrical sign would be expected to be attracted and hence aggregations might develop and the particles would be packed or caked. Also, these polar surfaces could be expected to be attracted to metallic surfaces and hence would coat the mill and grinding media.

The action of a grinding aid is then explainable in the following manner. A substance which functions as a grinding aid is probably one which surrounds the particles of cement with a film or layer. This layer shields the surface groups of the particle and produces an external surface which is uniform over the entire particle and is also identical on all particles. Therefore, a cement treated with a grinding aid is composed of particles of like surface characteristics and they tend to repel each other or remain dispersed.

As a part of my copending application Serial No. 173,841, filed November 10, 1937, I have discussed a theory relative to the action of glycols as grinding aids. Gallaugher and Hibbert (Journal of the American Chemical Society, vol. 59, Number 12, December 1937, pages 2514 et seq.) have studied glycols with a view to investigating the anamolous surface tensions observed at the air-liquid interfaces of their liquids. They have suggested that the glycol molecule orients itself at the interface in the form of an inverted U with the polar OH groups in the liquid and the ethylene oxide groups or group toward the air or in the sides of the U depending upon the number of such groups in the molecule. It is suggested that it is this latter group which controls the total surface energy.

As to the present invention, it appears that the substituted glycerol molecule may orient itself in a similar manner on the cement particle. That is to say, the OH groups may be attracted toward the polar surface of the particle so that the substituted group is set toward the air phase. For example the monoacetin molecule may orient itself in the form of an inverted Y where the esterified group forms the stem of the Y. The particles would then be pictured as being filmed with a uniform film of substituted glycerol molecules as soon as there are sufficient molecules so that the sum of their effective molecular areas is equivalent to the area of the particle surface. Thus, it is believed that it is the first layer or the "monomolecular layer" which is most effective in producing the grinding aid action and that the addition of other layers may not be of great significance. In fact, with some substances the addition of too many layers may vitiate the effect by having the surfaces of the particles assume the physical characteristics of the filming substance in bulk form rather than the characteristics of a monomolecular surface layer. Thus it is seen that the numerous cement particles have their peculiarly characteristic polar, surface groups shielded by like films and when they approach each other they present these like, non-color surfaces toward each other and therefore there is a tendency toward mutual repulsion rather than attraction.

I claim:

1. The process that includes, grinding Portland cement clinker admixed with a small percentage of a substituted glycerol to produce Portland cement in finely divided form.

2. The process that includes, grinding Portland cement clinker admixed with a small percentage of a halogen substituted glycerol to produce Portland cement in finely divided form.

3. The process that includes, grinding Portland cement clinker admixed with a small percentage of a glycerol having a substituted ester group of the acetyl, ethyl, propyl, butyl series, to produce Portland cement in finely divided form.

4. The process that includes, grinding Portland cement clinker admixed with a small percentage of glycerol monochlorohydrin to produce Portland cement in finely divided form.

5. The process that includes, grinding Portland cement clinker admixed with a small percentage of glycerol mono acetic ester to produce Portland cement in finely divided form.

6. The process that includes, grinding substantially dry Portland cement clinker admixed with a small percentage of a substituted glycerol to produce Portland cement in finely divided form.

7. The process that includes, grinding Portland cement clinker admixed with substantially 0.05% to 0.50% by weight of a substituted glycerol to produce Portland cement in finely divided form.

8. The process that includes, grinding Portland cement clinker admixed with a small percentage of a substituted glycerol to produce Portland cement having a specific surface in excess of substantially 2000.

9. Portland cement in dry form containing a small percentage of a substituted glycerol distributed uniformly throughout the cement and coating the individual particles thereof.

10. Portland cement in dry finely divided form containing a small percentage of a halogen substituted glycerol distributed uniformly throughout the cement and coating the individual particles thereof.

11. Portland cement in dry finely divided form containing a small percentage of a glycerol having a substituted ester group of the acetyl, ethyl, propyl, butyl series, said glycerol being distributed uniformly throughout the cement and coating the individual particles thereof.

12. Portland cement in dry finely divided form containing a small percentage of glycerol monochlorohydrin distributed uniformly throughout the cement and coating the individual particles thereof.

13. Portland cement in dry finely divided form containing a small percentage of glycerol mono acetic ester distributed uniformly throughout the cement and coating the individual particles thereof.

14. Portland cement in dry finely divided form containing substantially 0.05% to 0.50% by weight of a substituted glycerol distributed uniformly throughout the cement and coating the individual particles thereof.

15. Portland cement in dry finely divided form having a specific surface in excess of 2000 and containing a small percentage of a substituted glycerol distributed uniformly throughout the cement and coating the individual particles thereof.

IRA C. BECHTOLD.